S. R. EMERSON.
SAW GAGE.
APPLICATION FILED MAR. 28, 1916.
1,257,826.
Patented Feb. 26, 1918.
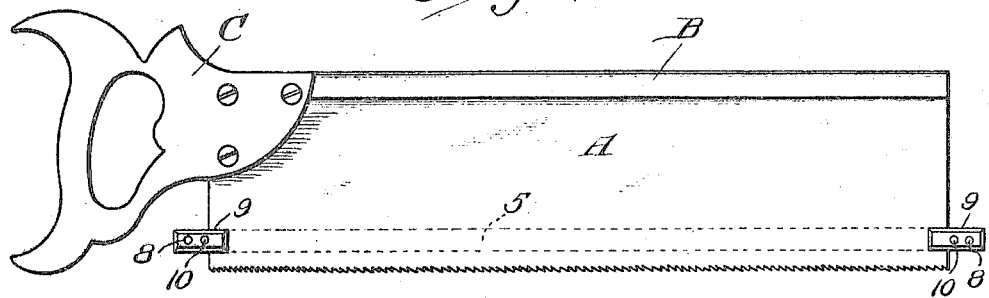
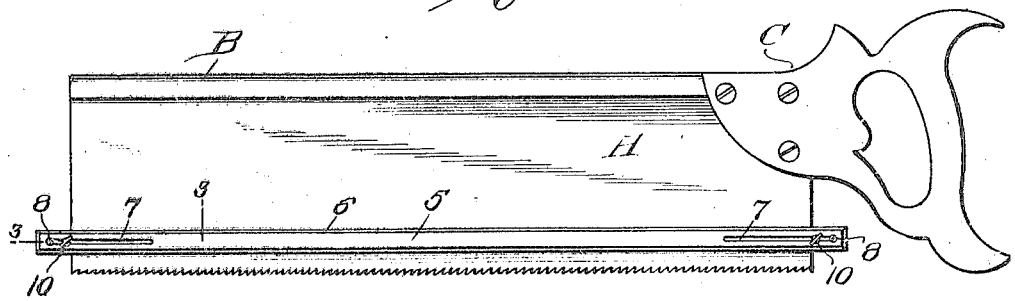
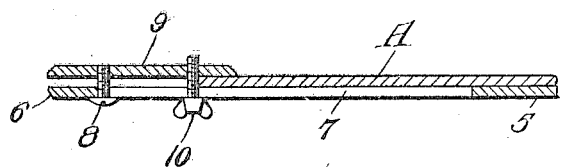
Inventor
S. R. Emerson,
By Victor J. Evans
Attorney
Witnesses

UNITED STATES PATENT OFFICE.

STEPHEN RAY EMERSON, OF CRESTON, IOWA.

SAW-GAGE.

1,257,826.   Specification of Letters Patent.   Patented Feb. 26, 1918.

Application filed March 28, 1916.  Serial No. 87,357.

*To all whom it may concern:*

Be it known that I, STEPHEN R. EMERSON, a citizen of the United States, residing at Creston, in the county of Union and State of Iowa, have invented new and useful Improvements in Saw-Gages, of which the following is a specification.

The invention relates to gages, and more particularly to the class of adjustable and detachable saw gages.

The primary object of the invention is to provide a gage of this character which is not only so constructed as to enable the gage to be quickly connected with a saw blade to regulate the depth of the cut to be made thereby, but also enables the gage to be used for this purpose upon saws, the blades of which differ in length.

A still further object of the invention is the provision of a gage of this character which is extremely simple in construction, thoroughly reliable and efficient in use, strong, durable, and inexpensive of manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of a saw showing the gage applied thereto;

Fig. 2 is a similar view looking toward the opposite face of the blade of the saw; and Fig. 3 is a sectional view on the line 3—3 of Fig. 1.

Similar reference characters indicate corresponding parts throughout the several views of the drawing.

Referring to the drawing in detail, A designates the blade and B the heel or back and C the handle of a saw, which is of the ordinary well known construction, and upon the blade is adapted to be adjustably mounted a gage hereinafter fully described. The gage comprises a straight bar 5 of uniform width and thickness in cross section throughout its length and is provided with beveled marginal edges 6, while formed in the said bar near opposite ends are longitudinally disposed elongated slots 7 for accommodating guide screws 8 supporting slidable clamping plates 9, which are fastened in adjusted position in a manner presently described.

Passed through each of the slots 7 is a winged binding bolt 10 which is threaded in a clamping plate 9, and in this manner the said plate is fastened on the bar for the secure clamping of the latter upon the blade A of the saw, said screws 8, bolts 10, and slots 7 permitting the adjustment of the plates on the bars to enable the gage to be applied to different lengths of saw blades.

In the application of the gage to a saw blade the clamping plates 9 are loosened and moved longitudinally of the bar 5 to permit the saw blade to be passed between the bolts 10 with the plates 9 overlapping the blade A at the ends thereof, and by tightening the screws 10 the plates 9 will securely clamp the blade between the same and the bar, thus securely fastening the gage upon the blade A of the saw.

This gage, when clamped upon the blade A of the saw, limits the cutting action thereof so that the cutting action can be accurately gaged in the work.

From the foregoing description, taken in conection with the accompanying drawing, the construction and operation of the herein described gage will be apparent and, therefore, a more extended explanation has been omitted.

Having thus described my invention, I claim:

1. A saw gage comprising a bar having a longitudinally extending slot adjacent each end thereof, plates adjacent the ends of the bar operable to connect the bar with a saw blade, and means for operating said plates passing through said slots and slidably connecting the plates with the bar whereby, the gage may be connected with saw blades differing in length.

2. The herein described gage for application to saw blades of different lengths, the same comprising a bar longer than the blade and having longitudinal slots near its ends, the bar adapted to lie against one side of the blade with the slots lapping the extremities thereof, plates adapted to lie against the opposite side of the blade and lap its extremities, a guide in each plate slidably mounted in one of the said slots, and a set screw threaded into each plate with its shank leading across the extremity of the blade and slidably mounted in said slot and its head standing on the remote side of the bar.

In testimony whereof I affix my signature in presence of two witnesses.

STEPHEN RAY EMERSON.

Witnesses:
R. BROWN,
H. C. STEVER.